(12) United States Patent
Miura et al.

(10) Patent No.: US 6,285,915 B1
(45) Date of Patent: Sep. 4, 2001

(54) NUMERICAL CONTROL DEVICE, AND SCREEN DISPLAY AND DATA INPUT AND OUTPUT METHOD FOR NUMERICAL CONTROL DEVICE

(75) Inventors: Kazuhiko Miura, Yokohama; Hiroshi Noda, Yamanashi; Hideaki Inoue, Tsuru; Koichi Murata, Fucyu, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/077,834

(22) PCT Filed: Oct. 8, 1997

(86) PCT No.: PCT/JP97/03612

§ 371 Date: Jun. 4, 1998

§ 102(e) Date: Jun. 4, 1998

(87) PCT Pub. No.: WO98/15881

PCT Pub. Date: Apr. 16, 1998

(30) Foreign Application Priority Data

Oct. 8, 1996 (JP) .................................................. 8-284573
Jul. 9, 1997 (JP) .................................................. 9-197974

(51) Int. Cl.[7] .................................................. G06F 19/00
(52) U.S. Cl. .......................... 700/181; 700/180; 700/184
(58) Field of Search .................................. 700/180, 181, 700/184

(56) References Cited

U.S. PATENT DOCUMENTS

| | | | |
|---|---|---|---|
| 4,703,441 | * 10/1987 | Kishi et al. | 345/196 |
| 4,731,607 | * 3/1988 | Yoneda et al. | 700/180 |
| 5,150,305 | * 9/1992 | Sikikawa | 364/474.24 |
| 5,317,501 | 5/1994 | Hilpert | 364/132 |
| 5,530,857 | 6/1996 | Gimza | 395/600 |
| 5,703,702 | * 12/1997 | Dundorf | 364/474.24 |

FOREIGN PATENT DOCUMENTS

| | | |
|---|---|---|
| 63-136107 | 6/1988 | (JP) . |
| 4-84204 | 3/1992 | (JP) . |
| 4-213760 | 8/1992 | (JP) . |
| 5-241631 | 9/1993 | (JP) . |
| 5-282031 | 10/1993 | (JP) . |
| 6-318110 | 11/1994 | (JP) . |
| 3-020456 | 11/1995 | (JP) . |
| 9-16239 | 1/1997 | (JP) . |
| 10-39309 | 2/1998 | (JP) . |

* cited by examiner

Primary Examiner—Richard Hjerpe
Assistant Examiner—Duc Q. Dinh
(74) Attorney, Agent, or Firm—Staas & Halsey, LLP (57) ABSTRACT

A personal computer incorporated in a numerical control device (CNC) has a function for emulating a CNC display circuit. This personal computer emulates a CNC display circuit and converts a transmitted display command A into a video signal for transmission to display means. The numerical control device (CNC) incorporating this personal computer need not to provide a display circuit for each of the CNC body and the personal computer, and, moreover, a switching circuit for selectively receiving the video signals from two display circuits and transmitting selected signal to the display means is not required either. Furthermore, the personal computer has a function for emulating a data input/output circuit of CNC. The personal computer inputs or outputs data transmitted from the CNC or data to be transmitted to the CNC, from or to a data input/output circuit in the personal computer to or from an external input/output device, through an input/output data RAM. Therefore, it is not necessary to provide data input/output circuits for both the CNC body and the personal computer.

12 Claims, 5 Drawing Sheets

NUMERICAL CONTROL DEVICE, AND SCREEN DISPLAY AND DATA INPUT AND OUTPUT METHOD FOR NUMERICAL CONTROL DEVICE

FIELD OF THE INVENTION

The present invention relates to a numerical control device, and more particularly, to a screen display and data input/output method for a numerical control device.

DESCRIPTION OF THE RELATED ART

Generally, a numerical control device comprises a control section and a drive section, and the control section can be divided further into a section for controlling data input operations, and a section for generating machine control information in real time on the basis of input information and transferring commands to the drive section.

Usually, the control section is provided with a dedicated computer and software for control purposes, and the drive section comprises a servo motor or main axis motor, or a servo amplifier for driving a motor of this kind. In order to carry out machining using a machine tool controlled by a numerical control device, in general, a processing program is previously created or input by the input operation control section in the control section of the numerical control device, and processing commands are output to the drive section in accordance with this processing program, thereby controlling the driving mechanism of the machine tool.

The aforementioned numerical control device is also provided with a display device, which displays various information, such as the input data, control status, etc., and is used in input operations and control.

Figure 4:
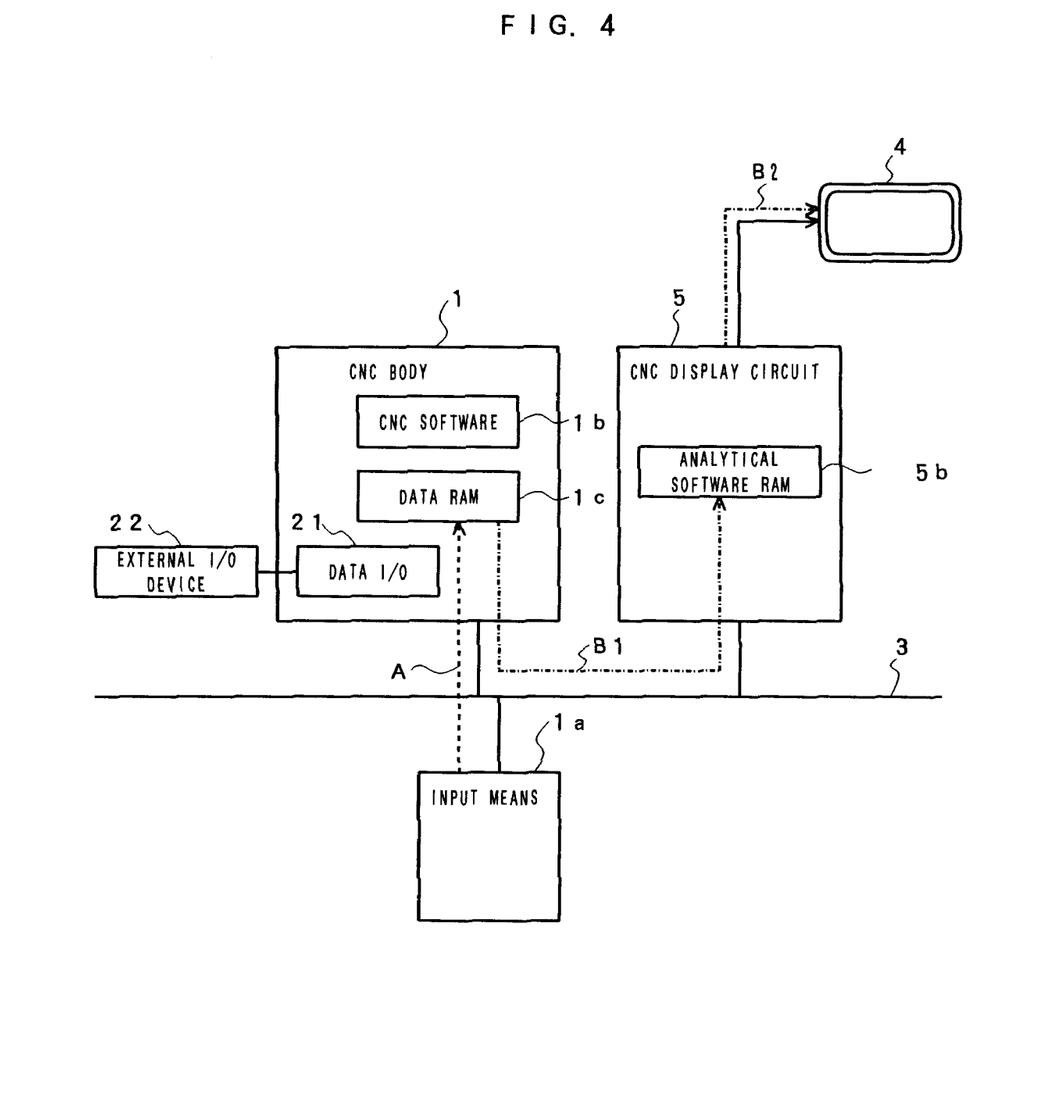
FIG. 4 is a block diagram for describing an outline of a display function in a conventional numerical control device.

FIG. 4 is a block circuit diagram for describing an outline of the display function of a conventional numerical control device. In FIG. 4, parts of the composition other than the display function of the numerical control device are omitted. In the diagram, a body (hereinafter, referred to as CNC body,) 1, comprising a control section and a drive section of a numerical control device, is connected via a bus 3 to a display circuit (hereinafter, referred to as CNC display circuit) 5, which drives a display device 4. The CNC body 1 is also connected via the bus 3 to input means 1a, such as a keyboard and a pointing device, such as a mouse and the like, and input data A is stored in a data RAM 1c.

In performing the display operation in the numerical control device, bit map data or graphics commands (B1) generated on the basis of the data stored in the aforementioned RAM 1c or the data in the CNC body 1 is transferred via the bus 3 to CNC display circuit 5, which generates a video signal B2 by means of analytical software stored in an internal RAM 5b, and provides required display on the display device 4.

Reference numeral 21 denotes a data input/output circuit comprising an interface conforming to standards such as RS232C, PCMCIA, or the like, and is designed for data input/output between the body 1 and an external CNC input/output device 22 for CNC.

By connecting a numerical control device of this kind to a personal computer which can easily be extended and adapted, the functions of an existing numerical control device can be modified or extended in accordance with the operator's needs or convenience.

Figure 5:
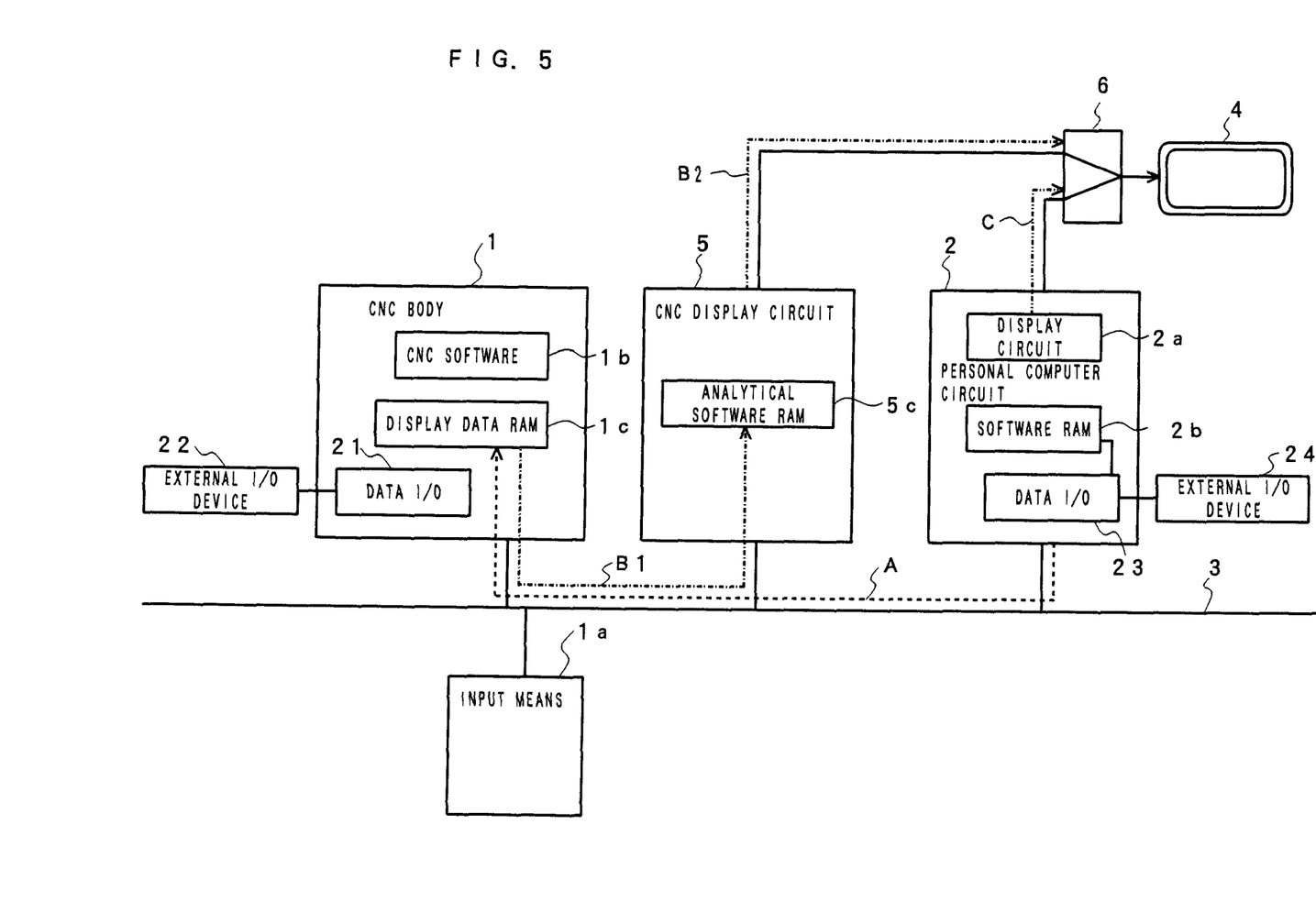
FIG. 5 is a block diagram for describing an outline of a display function of a conventional numerical control device having composition wherein a personal computer is incorporated.

FIG. 5 is a block diagram for describing an outline of a display function of a numerical control device incorporating a personal computer. In the composition shown in FIG. 5, a personal computer 2 is connected via a bus 3 to the numerical control device having the composition illustrated in FIG. 4 above, and both the CNC display circuit 5 and a display circuit 2a of the personal computer 2 are designed to be connectable to a common display device 4 by means of a switching circuit 6. When the CNC body 1 is to provide a display, it does so by transmitting a video signal B2 to the display device 4 by means of the CNC display circuit 5. On the other hand, when the personal computer 2 is to provide a display, it does so by transmitting a video signal C to the display device 4 by means of a display circuit 2a. In this method, a switching circuit 6 is provided among the CNC display circuit 5, personal computer 2 and the display device 4 in order that data from both the CNC body and the personal computer can selectively be displayed using the common display device 4 by operating the switching circuit 6 for selecting either video signal B2 or Video signal C, thereby transmitting one of the video signals to the display device 4. The memory means 2b is for storing software for controlling the personal computer, and data input/output between the personal computer and an external input/output device 24 for the personal computer is made by means of a data input/output circuit 23 conforming to standards such as RS232C, PCMCIA or the like.

Therefore, with a conventional numerical control device incorporating a personal computer, it is not only necessary to provide a display circuit for both the CNC body and the personal computer but also necessary to provide a switching circuit for selecting the video signal by its source, that is, the two display circuits, to transfer the selected signal to the display device. Furthermore, in the case of the conventional numerical control device, for data input/output, a separate data input/output interface for the personal computer (data input/output circuit 23), and a separate CNC data input/output interface (data input/output circuit 21) are required.

SUMMARY OF THE INVENTION

In a numerical control device incorporating a personal computer, and a screen display and data input/output method for a numerical control device, it is an object of the present invention to conduct screen display and data input/output without using a CNC display circuit and a switching circuit.

In order to achieve the aforementioned object, the screen display and data input/output method according to the present invention comprise steps of: transferring display commands generated by a numerical control device to a personal computer incorporated in the numerical control device, emulating a display circuit function of the numerical control device to convert the display commands into a video signal and transmitting the converted video signal to display means, and displaying display contents from the numerical control device on a screen of the display means using the video signal. Further, it is preferable for the present invention to have an external input/output device connected to the computer, and comprise the steps of: transferring data from the numerical control device to the personal computer and, through which, outputting the data to the external input/output device, when the display contents from the numerical control device is displayed on a screen of the display means, and transferring numerical control data input from the external input/output device to the numerical control device.

Furthermore, in the numerical control device according to the present invention, a personal computer is connected via a bus to a numerical control device body, and a converting means for emulating a function for displaying display commands generated by the numerical control device body is added to the circuitry of the personal computer so that display command generated by the numerical control device body can be converted into a video signal by the converting means and displayed.

Preferably, the converting means comprises data storing means for storing display command, and conversion control means for converting display command into a video signal and controlling output thereof.

More preferably, the conversion control means comprises software storing means, the software storing means being designed for storing analytical software for analyzing and converting display command into a video signal, and drivers for controlling output of the video signal.

Even more preferably, the personal computer comprises data transfer means for transferring data between the personal computer and the numerical control device, and data input/output means for data input/output between the personal computer and the external input/output device.

According to the present invention, in a numerical control device incorporating a personal computer, it is possible to display on a screen the contents of display command generated by the numerical control device body, without providing a display circuit or switching circuit for the numerical control device body.

Furthermore, since it is not necessary to provide a data input/output circuit or interface for the numerical control device body in order to be connected to an external input/output device, the composition of the numerical control device can be simplified and thus manufacturing costs can be reduced.

DESCRIPTION OF THE PREFERRED EMBODIMENTS

Figure 2:
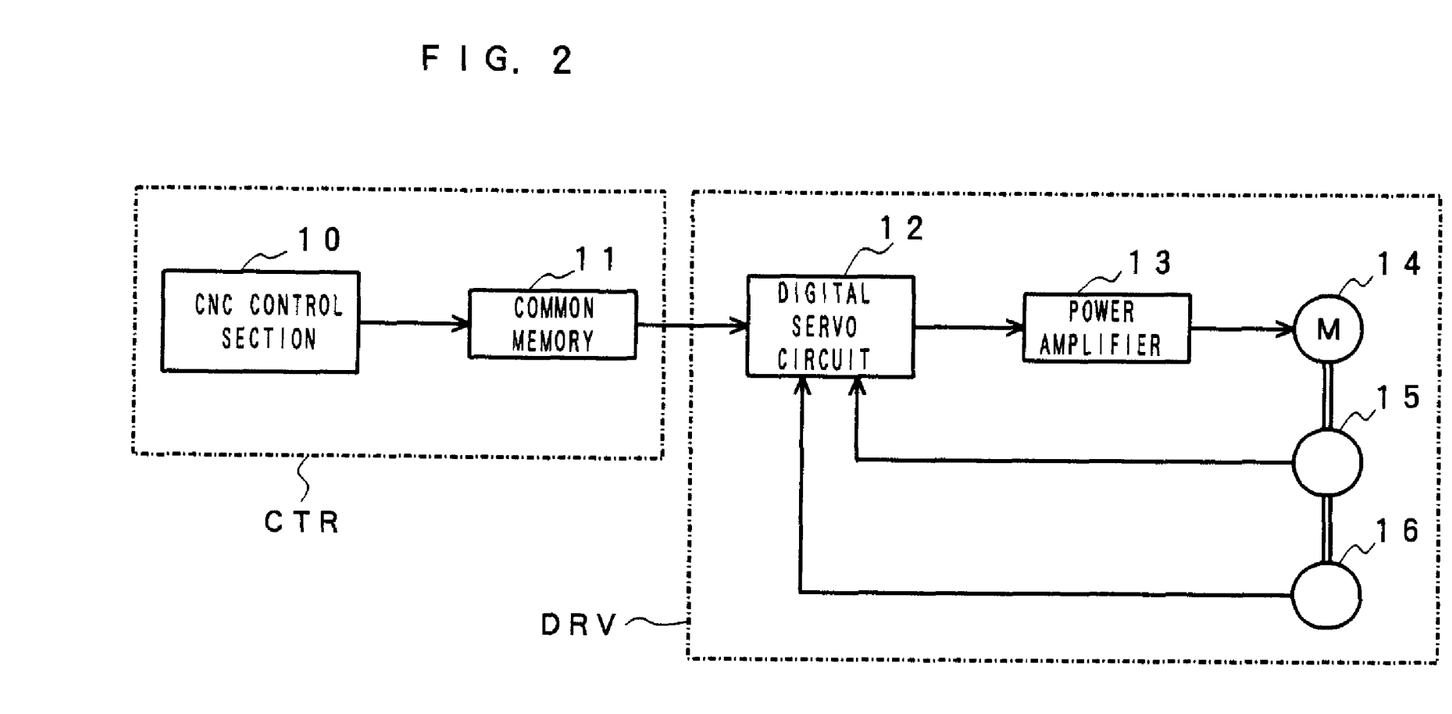
FIG. 2 is a block diagram of a servo motor control system in a numerical control device to which an embodiment of the present invention can be applied.

Firstly, a description is given of a servo motor control system in a numerical control device, to which an embodiment of the present invention can be applied, with reference to the schematic block diagram in FIG. 2. The servo motor control system used here is virtually the same as a conventional control system, and is therefore only described in general terms here.

In FIG. 2, 10 is a CNC control section including a computer; 11 is a common RAM; 12 is a digital servo circuit including a processor (CPU), ROM and RAM and the like; 13 is a power amplifier, such as a transistor inverter or the like; 14 is an AC servo motor; 15 is an encoder for generating pulses as the AC servo motor 14 rotates; and 16 is a rotor position detecting device for detecting the rotor phase.

The CNC control section 10 and common RAM 11 form the control section CTR of the numerical control device; and the common RAM 11, digital servo circuit 12, power amplifier 13, AC servo motor 14, encoder 15, and rotor position detecting device 16 form the drive section DRV of the numerical control device. Usually, the control section CTR is provided with a dedicated computer and software for control purposes, and the drive section DRV is provided with a servo motor or main axle motor, or a servo amplifier for driving such a motor. Generally, in carrying out machining by means of a machine tool controlled by the numerical control device, a machining program is previously created or input by the input operation control section of the control section CTR, and machining commands are output to the drive section DRV in accordance with this machining program, thereby controlling the driving mechanism of the machine tool.

A generally used CNC control section comprises a section for controlling data input operations (CNC display circuit), and a section for generating machine control information in real time on the basis of input information and transferring commands to the drive section, but the CNC control section 10 in the numerical control device incorporating a personal computer according to the present invention does not comprise a CNC display circuit, by performing the function of the CNC display circuit by emulation on the side of the personal computer.

Figure 1:
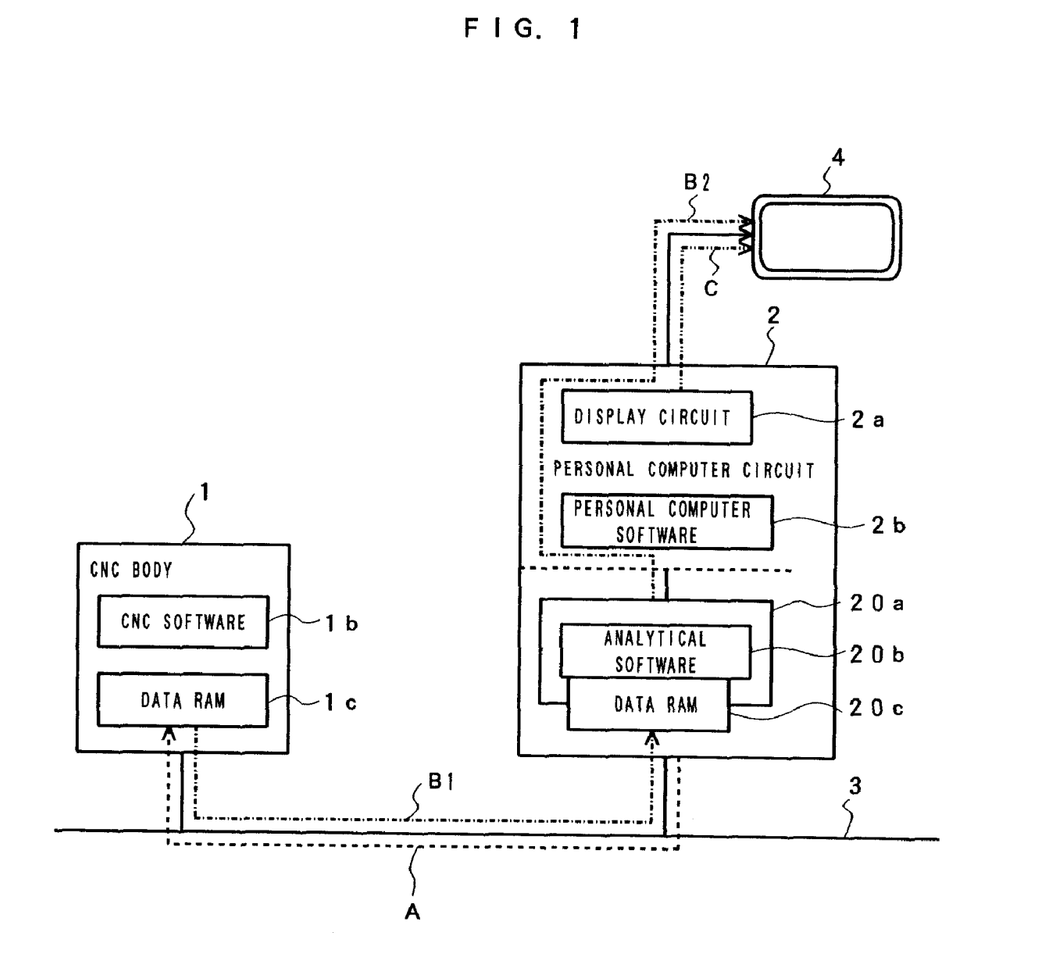
FIG. 1 is a block diagram showing an outline of a numerical control device according to one mode of implementing the present invention, wherein a personal computer is incorporated.

Next, a mode for implementing a numerical control device incorporating a personal computer according to the present invention is described using the schematic block diagram in FIG. 1.

In FIG. 1, the numerical control device incorporating a personal computer can be formed by a configuration wherein a CNC body 1 (numerical control device body) is connected to a personal computer 2 via a bus 3.

The CNC body 1 comprises a control section CTR including at the least a CNC control section 10 and a common memory 11, as illustrated in FIG. 2, and the drive section CTR comprises storing means 1b for storing software for controlling the CNC body, and storing means 1c for storing generated data. Here, the storing means 1b and 1c may be constituted either of the common RAM 11 or of a dedicated RAM.

The personal computer 2 may comprise a signal conversion means 20a added to a generally used personal computer. A personal computer 2 includes in its standard sections storing means for storing software for controlling the personal computer, and a display circuit 2a. And the display contents from the personal computer 2 itself are generated by the display circuit 2a, which is a standard section, in the form of a video signal C, and are then displayed by transmitting this video signal C to the display device 4.

A personal computer incorporated into the numerical control device according to the present invention is provided with signal converting means 20a for emulating the display function of the CNC body 1. This signal converting means 20a comprises data storing means 20c for receiving and storing display contents from the CNC body 1, software storing means 20b for storing analytical software for analyzing data stored in the data storing means 20c and generating a video signal, and a driver (software) for controlling the output of the video signal and transmitting it to the display device 4. The driver software can be formed using command designated by the user through the personal computer.

The display contents deriving from the CNC body 1 comprise, for example, bit map data, graphics command or the like, and the analytical software analyzes the bit map data and the digital data for the graphics commands to generate analogue video signal B2. The personal computer 2 generates a video signal B2 corresponding to the display contents from the CNC body 1 using this analytical software, and it controls the output of the generated video signal B2 using the driver.

Therefore, the personal computer 2 transfers the display contents from the personal computer to the display device 4 by means of the display circuit 2a in the form of a video signal C, and a screen showing these display contents is displayed, and, furthermore, it transfers the display contents from the CNC body to display device 4 by means of the appended signal converting means 20a in the form of a video signal B2, and a screen showing these display contents is displayed.

The selection regarding which of video signal B2 or video signal C is output can be made by switching in the personal computer. Possible methods for switching video signal include a method of switching based on key input, or the like, at the personal computer, or a method whereby the personal computer monitors the data storing means 20c periodically and generates a video signal when it detects that display contents from the CNC body are stored in the data storing means 20c, the display being switched from the personal computer display to the CNC body display in accordance with a display request, or the like.

A RAM, or the like, for example, may be used as aforesaid storing means.

Therefore, according to the mode for implementing the present invention illustrated in FIG. 1, it is possible to omit the CNC display circuit and the video signal switching circuit. Furthermore, even if the device composition omits the CNC display circuit, emulation can be made by means of analytical software in the personal computer, and the display contents are analyzed and converted into a video signal, so that similar operation to that performed by a CNC display circuit can be achieved.

Moreover, since the operator can determine commands for the driver as he or she wishes, the operation can be modified to suit the operator's method of application, without changing the CNC body.

Figure 3:
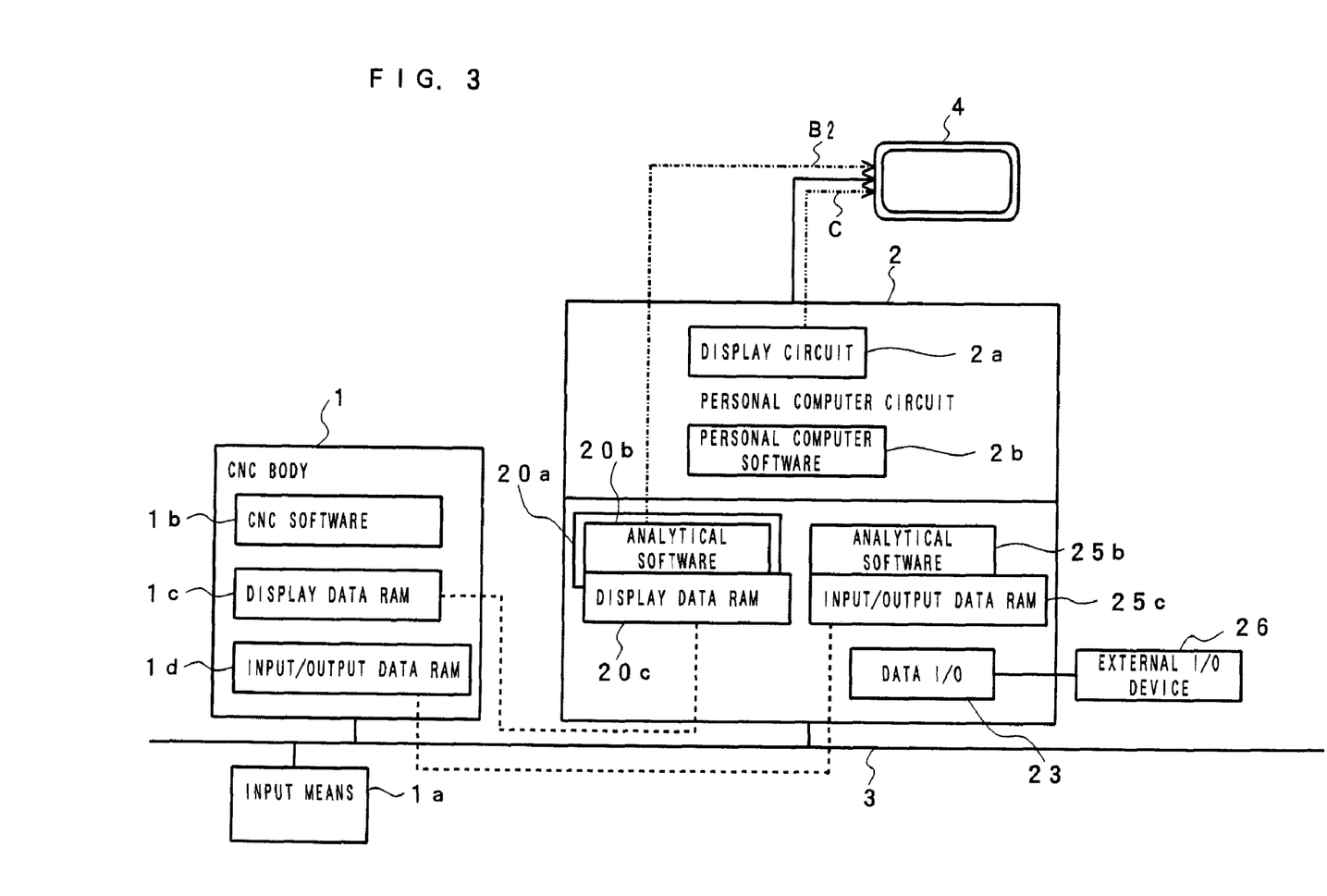
FIG. 3 is a block diagram showing an outline of another embodiment of a numerical control device incorporating a personal computer according to the present invention.

Next, a further mode for implementing a numerical control device incorporating a personal computer according to the present invention is described with reference to the schematic block diagram in FIG. 3.

The composition of the personal computer 2 required for omitting the CNC display circuit and video signal switching circuit, in other words, the composition of the signal converting means 20a, data storing means 20c, and software storing means 20b, is similar to that in the mode of implementation illustrated in FIG. 1.

The data RAM 1d in the CNC body 1 functions as a data input/output buffer between the CNC body 1 and an external input/output device.

The data RAM 25c in the personal computer 2 is a data input/output buffer between the personal computer 2 and an external input/output device, and it is connected to the microprocessor of the personal computer via an internal bus. The data input/output circuit 23 comprises an interface conforming to RS232C standards, PCMCIA standards, or the like, connected to the external input/output device 26, and it is connected to the internal bus of the personal computer 2.

Similarly to a conventional personal computer, the analytical software 25b has a function for successively reading data of a prescribed length from the data input/output circuit 23 by means of the microprocessor in the personal computer 2 and storing the data temporarily in the data RAM 25c, when the data for personal computer is displayed on the screen of the display device 4, and storing the contents of this data in a main memory of the personal computer 2 via the microprocessor of the personal computer 2 (when data from the external input/output device 26 is to be input to the personal computer 2), as well as a function for successively reading data of a prescribed length from the main memory of the personal computer 2 by means of the microprocessor in the personal computer 2 and storing the data temporarily in the data RAM 25c each time reading is carried out, and outputting the contents of the data to the data input/output circuit 23 by means of the microprocessor in the personal computer 2 (when data from the personal computer 2 is output to the external input/output device 24). Hereinafter, these functions are referred to as standard input/output functions.

Furthermore, the analytical software 25b in this mode of implementation has a function of successively reading data of a prescribed length from the data input/output circuit 23 by means of the microprocessor in the personal computer 2 and storing the data temporarily, when the data for the numerical control device is displayed on the screen of the display device 4, and transferring the contents of this data, each time reading is carried out, to the data RAM 1d of the CNC body 1 through the bus and the microprocessor in the personal computer 2 (when data from the external input/output device 26 is input to the CNC body 1 via the personal computer 2) as well as a function for reading data from the data RAM 1d of the CNC body 1 by means of the microprocessor in the personal computer 2 and storing the data temporarily in the data RAM 25c, and outputting the contents thereof to the data input/output circuit 23 via the microprocessor in the personal computer 2 (when data from the CNC body 1 is output to the external input/output device 26 via the personal computer 2). Hereinafter, these functions are referred to as remote input/output functions.

In brief, the analytical software 25b comprises a driver software providing standard input/output function and a driver software providing remote input/output function. When data for the numerical control device is displayed on the screen of the display device 4 by the input means 1a, the driver software providing remote input/output function is selected to enable the data for the numerical control device to be input and output. Furthermore, when data for the personal computer is displayed on the screen of the display device 4, the driver software providing the standard input/output functions is selected and data for the personal computer can be input and output.

Consequently, the CNC body 1 and external input/output device 26 can be connected indirectly through the personal computer 2, and so, even when a data input/output circuit 21, as illustrated in the conventional example in FIG. 5, and an RS232C- or PCMCIA-standard interface, or the like is not provided additionally in the CNC body 1, data can be input and output between the CNC body 1 and the external input/output device 26. Hence, by composing a CNC body 1 without comprising an input/output circuit 21 or an RS232- or PCMCIA-standard interface or the like, the composition of the CNC body 1 can be simplified, and, as a result, its manufacturing costs can be reduced.

What is claimed is:

1. A screen display and data input/output method for a numerical control device comprising:

transmitting a display command generated by a numerical control device to a personal computer incorporated in said numerical control device;

emulating a display circuit function of said numerical control device by said personal computer to convert said display command into a video signal and to transmit the converted video signal to a display means; and displaying display contents from said numerical control device corresponding to said video signal on a screen of said display means.

2. The screen display and data input/output method for a numerical control device according to claim 1, further comprising:

connecting an external input/output device to said personal computer;

transferring data from the numerical control device to the personal computer for output to the external input/output device, when the display contents from the numerical control device are displayed on the screen of said display means; and transferring data for numerical control, input from said external input/output device, to the numerical control device.

3. A numerical control device including a numerical control device body connected to a personal computer through a bus, comprising:

converting means, included in the personal computer, for emulating a function for displaying display commands generated by said numerical control device body, wherein the display commands generated by the numerical control device body are converted into a video signal by said converting means and displayed.

4. The numerical control device according to claim 3, wherein said converting means comprises:

data storing means for storing display commands; and conversion control means for converting display commands to a video signal and controlling an output thereof.

5. The numerical control device according to claim 4, wherein said converting means further comprises:

software storing means for storing analytical software for analyzing display commands and converting the display commands into a video signal, and a driver for controlling the output of the video signal.

6. The numerical control device according to claim 3, wherein said personal computer comprises:

data transfer means for transferring data between said personal computer and the numerical control device body; and data input/output means for data input/output between the personal computer and an external input/output device.

7. The numerical control device according to claim 4, wherein said personal computer comprises:

video signal switching means for selecting whether display contents generated by the personal computer are converted into a video signal by a personal computer display circuit, transmitted to the display device, and displayed, or whether display commands generated by the numerical control device body are converted into a video signal by said converting means, added to the personal computer and displayed on a screen.

8. The numerical control device according to claim 7, wherein said video signal switching means comprises:

monitoring means for monitoring said data storing means periodically; and video signal generating means for generating a video signal by said converting means in response to said monitoring means detecting that display command contents generated by the numerical control device body are stored in the data storing means.

9. A numerical control device comprising a numerical control device body and a personal computer connected to said numerical control device body through a bus, wherein said personal computer comprises:

a display circuit to generate a video signal from display contents of said personal computer;

signal converting means comprising data storing means for receiving and storing display contents of the numerical control device body, the display contents comprising digital data, including bit map data or graphics commands;

a data analyzing means for analyzing the digital data stored in the data storing means and generating an analogue video signal corresponding to the display contents of the numerical control device body;

a driver for controlling the output of the video signal generated by said signal converting means; and video signal switching means for selecting whether the display contents of the personal computer are transmitted, as a video signal for display on a screen, by said display circuit to the display device body connected to said personal computer, and displayed, or whether the display contents of the numerical control device body are transmitted, as a video signal by said signal converting means to said display device, and displayed.

10. The numerical control device according to claim 9, wherein said personal computer comprises:

monitoring means for monitoring said data storing means periodically; and a video signal generation commanding means for commanding generation of a video signal in response to said monitoring means detecting that display contents of the numerical control device body, including digital data, is stored in said data storing means.

11. A numerical control device including a numerical control device body and a personal computer connected to said numerical control device body through a bus, wherein said numerical control device body comprises:

a first data RAM which functions as a data input/output buffer between the numerical control device body and an external input/output device; and said personal computer comprises:

a display circuit to generate a video signal from display contents of said personal computer, signal converting means including data storing means for receiving and storing display contents of the numerical control device body, the display contents including digital data, such as bit map data or graphics commands;

data analyzing means for analyzing the digital data stored in the data storing means and generating an analogue video signal corresponding to the display contents of the numerical control device body;

a second data RAM, which is connected to a microprocessor of said personal computer via an internal bus, and functions as a data input/output buffer between the personal computer and the external input/output device;

a data input/output circuit including an interface to connect to said external input/output device, which is connected to an internal bus of said personal computer; and first input/output control means having a first data input function and a first data output function;

wherein the first data input function includes reading data from the external input/output device by said data input/output circuit and temporarily storing the data in said second data RAM, when display contents of the personal computer are displayed on said display device, and storing the contents stored temporarily in said second data RAM in the main memory of said personal computer, and wherein the first data output function includes reading data stored in the main memory of said personal computer and temporarily storing the data in said second data RAM, and these temporarily stored contents are fetched to be output to said data input/output circuit, and the data is transferred to the external input/output device.

12. The numerical control device according to claim 11, wherein said data analyzing means comprises:

a second input/output control means for performing a second data input function and a second data output function, wherein the second data input function includes reading data from an external input/output device by said data input/output circuit and temporarily storing the data in said second data RAM, when contents from the numerical control device body are displayed on said display device, and transferring the contents stored temporarily in said second data RAM to said first data RAM of the numerical control device body, and wherein the second data output function includes reading data from the first data RAM in said numerical control device body, and transferring to and temporarily storing the data from the first data RAM in said second data RAM, and the contents are output to said data input/output circuit and transferred to the external input/output device.

* * * * *